Sept. 4, 1951 W. N. DEAN ET AL 2,566,827

PULSE LENGTHENING CIRCUIT

Filed June 24, 1946

*INVENTORS*
WALTER N. DEAN
LEONARD P. MAUTNER
*BY* M. O. Hayes
*ATTORNEY*

Patented Sept. 4, 1951 2,566,827

UNITED STATES PATENT OFFICE 2,566,827

PULSE LENGTHENING CIRCUIT

Walter N. Dean, Larchmont, and Leonard P. Mautner, Bronx, N. Y., assignors, by direct and mesne assignments, to the United States of America as represented by the Secretary of the Navy Application June 24, 1946, Serial No. 678,784

4 Claims. (Cl. 250—27)

This invention relates generally to electronic circuits for increasing pulse time duration and particularly to an electronic circuit for lengthening to a predetermined duration only those pulses whose time duration exceeds a predetermined length with optional means to further limit the produced pulse by gating.

In radar, radio, television, and other electronic fields it is frequently desirable to respond to actuating signals with voltage pulses of a definite and recognizable duration greater than the actuating signal. It may further be desirable to employ an element of discrimination in the pulse lengthening arrangement so that it will respond only to actuating pulses of or greater than a certain duration. Examples of pulses which might thereby be eliminated are radar pulses, beacon pulses, intended interference pulses, random noise, or a combination of the foregoing. The circuit can be further discriminatory so as to be sensitive only to pulses occurring at a certain time as determined by a gating circuit.

This pulse lengthening circuit may have many useful applications both in connection with and independent of its discriminatory characteristics. For example, it may be used as a means of pulse coding whereby intelligence is conveyed by means of pulses of prescribed lengths which are aroused by a separate chain of pulses. The class of pulse suitable to arouse the circuit may of course be controlled by the discriminatory features therein. In certain types of identification systems this circuit would be well adapted to respond only to pulses whose time duration is above a prescribed minimum with pulses lengthened to a prescribed greater time duration. Similarly, this circuit can be applied as an identification or a controlled response means in many forms of electronic navigational aid systems.

It is an object of this invention to provide a circuit which is responsive only to potential variations or electrical impulses exceeding in duration a predetermined duration.

It is another object of this invention to provide a circuit which will produce long electrical impulses or potential variations from shorter ones.

It is another object of this invention to provide a circuit which will produce electrical impulses or potential variations of a predetermined time duration from shorter impulses or variations whose duration must exceed a predetermined time.

It is another object of this invention to provide a circuit which will produce electrical impulses or potential variations of a predetermined time duration from shorter impulses or variations whose duration must exceed a predetermined time, the circuit being also suitable for association with gating electrical impulses or potential variations whose time duration will constitute the maximum period during which any produced impulses or variations may occur and continue.

Other objects and advantages of the invention will be apparent from the following description and accompanying drawings, in which.

Briefly, this circuit accepts pulses exceeding a predetermined minimum duration and produces therefrom output pulses of a controllable duration. It uses the initial pulse to cut off a first tube and generate a rising saw tooth voltage. If the tube is held cut off for a sufficiently long interval the saw tooth voltage becomes great enough to fire a second tube ordinarily biased below cutoff. This begins the output pulse which is continued after the initial pulse by coupling the negative signal at the second tube back to the grid of the first tube. The pulse is terminated by a rising saw tooth voltage on said grid of the first tube generated by an integrating circuit tied to B+ which will eventually fire the first tube. The output pulse may be further controlled by requiring the presence of a positive gating circuit at the second tube to permit it to conduct.

Figure 1:
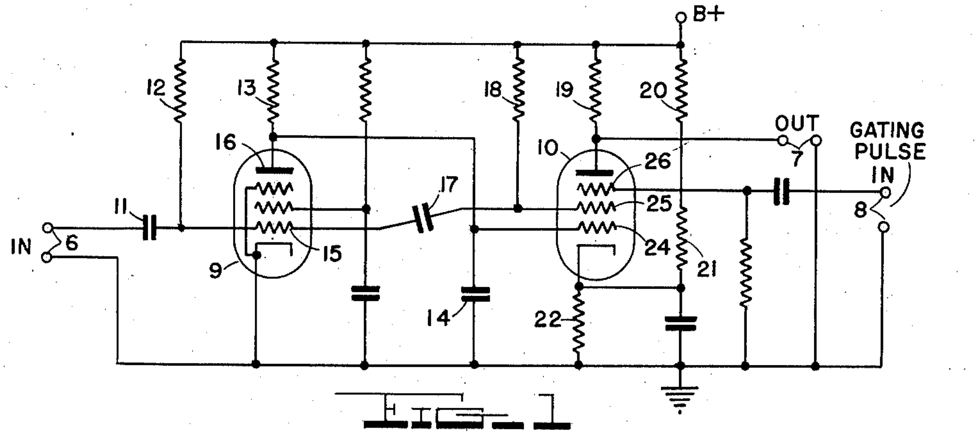
Fig. 1 is a schematic circuit drawing of one embodiment of this invention.

Referring now to Fig. 1 in detail, a negative pulse is applied at the terminals 6 through a coupling capacitance 11 to the control grid 15 of a pentode type vacuum tube 9. This grid is further connected to B+ by a high resistance 12. The cathode is tied to ground and the tube is normally conducting. The pulse applied at terminals 6 must be of sufficient amplitude to cut off the tube 9, whereupon the voltage at its plate 16 which had been dropped through a plate loading resistance 13 will tend to rise to B+. However, a capacitor 14 is tied between said plate 16 and ground and will cause the voltage at the plate 16 to rise in a sawtooth form determined by the time constant of the capacitor 14 and the plate loading resistance 13. A second pentode type tube 10 is normally biased below cutoff by connecting its cathode between resistances 21 and 22 of the bleeder resistance 20, 21, and 22 tied between B+ and ground. The capacitor 14 is also connected to the control grid 24 of the second tube 10; when the sawtooth voltage across this condenser has reached the desired value the tube 10 will start to conduct causing a voltage drop across its plate loading resistance 19 and its screen loading resistance 18. The drop across the plate resistance 19 is taken at terminals 7 between plate and ground as the beginning of the long output pulse. The voltage drop at the screen grid 25 of tube 10 is coupled back to the control grid 15 of the first tube 9 through a capacitance 17. This negative pulse coupled back to grid 15 will maintain tube 9 below cutoff even after the termination of the negative pulse applied at the terminals 6.

The coupling capacitor 17 will begin to charge up through the screen loading resistance 18 dependent in part on the RC time constant of said capacitance and resistance. This produces a second rising sawtooth voltage which may be arranged to cause the first tube 9 to resume conduction. Because of the voltage drop across the plate resistance 13, the second tube 10 resumes a state of non-conduction and terminates the long output pulse.

If desired, the output pulse may be further controlled by applying a positive gating pulse such as could be generated by a free running multivibrator through terminals 8 to the suppressor grid 26 of the second tube 10. The output pulse will then occur only during coincidence of the gating pulse and the input pulse and its duration can be limited by shortening the duration of the gating pulse.

Figure 2:
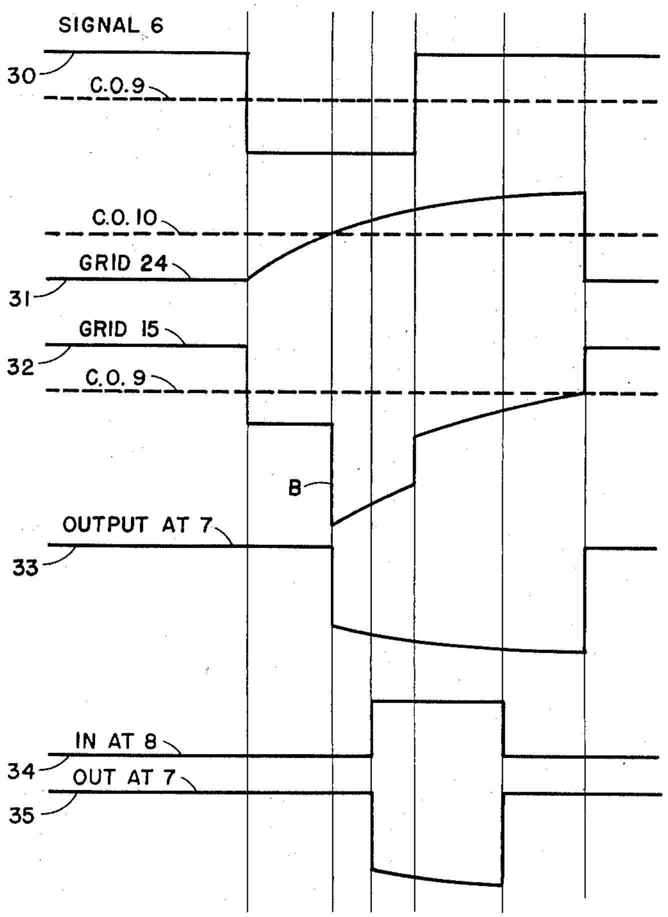
Fig. 2 is a series of waveforms useful in explaining the operation of the circuit in Fig. 1.

Referring now to the waveforms in Fig. 2, it is important to note that the time relation between the various waveforms is indicated by vertical lines. Waveform 30 shows the negative pulse applied to the circuit of Fig. 2 at terminals 6. The cutoff point of the first tube 9 is indicated by the dotted horizontal line thereby clearly indicating that said tube will be cut off by said pulse. Waveform 31 shows the rising sawtooth voltage applied to the second tube 10. The dotted horizontal line demonstrates the cutoff point for tube 10. Waveform 32 represents the voltage on the control grid 15 of tube 9. It is seen that the addition of the rising negative voltage from the screen grid 25 (indicated at B) of tube 10 will keep tube 9 cut off after the termination of the negative pulse 30. The output pulse is shown in waveform 33. Comparison with waveform 32 shows that the output pulse terminates when tube 9 again conducts. Waveforms 34 and 35 show what would happen to the output pulse if it were gated by a pulse beginning after the input pulse and terminating before the output pulse would otherwise have terminated.

To those skilled in the art it is apparent that many changes could be made to the circuit discussed without departing from the spirit of the invention. For example, these tubes might be changed to triodes, or some of the resistances might be made variable to establish control over the length of the output pulse and the length required of the input pulse.

Although we have shown and described only a limited and specific embodiment we are fully aware of the many modifications possible thereof. Therefore this invention is not to be limited except insofar as necessitated by the spirit of the prior art and the scope of the appended claims.

What is claimed is:

1. A pulse lengthening circuit comprising, a first vacuum tube biased in a normally conducting state and having at least anode, cathode, and control grid electrodes, a signal input terminal connected to said control grid, an energy supply source having positive and negative terminals, a first condenser connected between the anode of said first tube and said negative terminal, a first resistance connected between the anode of said first tube and said positive terminal, a second vacuum tube biased in a normally non-conducting state and having a control grid connected to the anode of said first tube, said first condenser and resistor being selected to provide a time constant that raises the control grid of said second tube to cut-off when negative pulses at said input terminal hold said first tube non-conducting for a predetermined period, a second resistance connected between said positive terminal and said second tube for supplying current thereto, and a second condenser coupling the tube end of said second resistor to the control grid of said first tube, said second condenser and resistor being selected to provide a time constant that holds said first tube non-conducting for a predetermined period of time in response to the initiation of conduction in said second tube.

2. A pulse lengthening circuit comprising, a first vacuum tube having at least anode, cathode, and control grid electrodes, a signal input terminal connected to said control grid, an energy supply source having positive and negative terminals, grid return means connecting the control grid of said first tube to said positive terminal for biasing said first tube normally conducting, a first condenser connected between the anode of said first tube and said negative terminal, a first resistance connected between the anode of said first tube and said positive terminal, a second vacuum tube biased in a normally non-conducting state and having a control grid connected to the anode of said first tube, said first condenser and resistor being selected to provide a time constant that raises the control grid of said second tube to cut-off when negative pulses at said input terminal hold said first tube non-conducting for a predetermined period, a second resistance connected between said positive terminal and said second tube for supplying current thereto, and a second condenser coupling the tube end of said second resistor to the control grid of said first tube, said second condenser and resistor being selected to provide a time constant that holds said first tube non-conducting for a predetermined period of time in response to the initiation of conduction in said second tube.

3. A pulse lengthening circuit comprising, a first vacuum tube having at least anode, cathode and control grid electrodes, a signal input terminal connected to said control grid, an energy supply source having positive and negative terminals, grid return means connecting the control grid of said first tube to said positive terminal for biasing said first tube normally conducting, a first condenser connected between the anode of said first tube and said negative terminal, a first resistance connected between the anode of said first tube and said positive terminal, a second vacuum tube having at least anode, cathode, control and screen grid electrodes, said second tube being biased normally non-conducting and having its control grid directly coupled to the anode of said first tube, an output terminal connected to the anode of said second tube, said first condenser and resistor being selected to provide a time constant that raises the control grid of said second tube to cut-off when negative pulses at said input terminal hold said first tube non-conducting for a predetermined period, a second resistance connected between said positive terminal and the screen grid of said second tube, a second condenser coupling said screen grid to the control grid of said first tube, said second condenser and resistor being selected to provide a time constant that holds said first tube non-conducting for a predetermined period of time in response to the initiation of conduction in said second tube.

4. A pulse lengthening circuit comprising, a first vacuum tube biased in a normally conducting state and having at least anode, cathode, and control grid electrodes, a signal input terminal connected to said control grid, an energy supply source having positive and negative terminals, a first condenser connected between the anode of said first tube and said negative terminal, a first resistance connected between the anode of said first tube and said positive terminal, a second vacuum tube biased in a normally non-conducting state and having a control grid connected to the anode of said first tube, means introducing to said second tube an enabling pulse without which said second tube cannot become conducting, said first condenser and resistor being selected to provide a time constant that raises the control grid of said second tube to cut-off when negative pulses at said input terminal hold said first tube non-conducting for at least a predetermined period and until the arrival of an enabling pulse, a second resistance connected between said positive terminal and said second tube for supplying current thereto, and a second condenser coupling the tube end of said second resistor to the control grid of said first tube, said second condenser and resistor being selected to provide a time constant that holds said first tube non-conducting for a predetermined period of time in response to the initiation of conduction in said second tube.

WALTER N. DEAN.
LEONARD P. MAUTNER.

REFERENCES CITED

The following references are of record in the file of this patent:

UNITED STATES PATENTS

| Number | Name | Date |
| --- | --- | --- |
| 2,418,425 | Poch | Apr. 1, 1947 |